Patented June 22, 1954

2,681,856

UNITED STATES PATENT OFFICE 2,681,856

PHOTOGRAPHIC MATERIAL AND PROCESS FOR MAKING AN AZO DYE BLEACHOUT IMAGE

Bela Gaspar, Beverly Hills, and Paul Daniel Dreyfuss, Van Nuys, Calif., assignors, by mesne assignments, to said Gaspar No Drawing. Application April 4, 1949, Serial No. 85,476

8 Claims. (Cl. 95—2)

1

This invention relates to the production of dye images from photographic silver images by a process which comprises the synthesis of an azo dye in the exposed photographic emulsion layer.

In the United States Letters Patent 2,071,688 dated February 23, 1937, is described and claimed a method of producing color photographic images in which the photographic layer is subject to two treatments, the first treatment consisting of the conversion of a dye-forming substance into a dye and the second treatment consisting of the local dye destruction at the required points. Thus, for example, a diazo compound is transformed into an azo dye by coupling with a phenol; or a phenol or other azo coupler is transformed into an azo dye by treating with a diazo compound, the azo dyes thus formed then being destroyed locally. In the same patent is described and claimed an alternative process in which the first treatment consists of the local destruction of the dye-forming substance, the second treatment then consisting of the conversion of the remaining dye-forming substance into the dye. Further alternative processes are described in the U. S. Patents 2,166,049; 2,271,176; 2,333,126; 2,361,541; 2,368,463 and in the co-pending U. S. patent applications S. N. 518,256, filed January 14, 1944, now Patent No. 2,514,233, and S. N. 541,282, filed June 20, 1944, now abandoned.

In the production of three different azo dyes, e. g., yellow, magenta and cyan, in a photographic three-layer material containing only coupling components or only diazo (or diazo-forming) compounds, it is difficult to find a combination of three diazo (or diazo-forming) compounds which will react with only one azo coupling component to produce three dyes of the required shade; or to find a combination of three azo coupling components which will react with only one diazo compound to produce the three dyes. One way to overcome this difficulty is to dye one part of the three layers (e. g., the top layer) by a different method.

According to the present invention it is possible to produce three azo dyes from three coupling components with one or more diazo compounds. More particularly, our invention relates to the production of three primary colors in the three layers of a photographic material from two colorless and one colored azo coupling component.

2

One object of the present invention is to produce a photographic material which comprises a support, thereon a red sensitive emulsion layer containing a colored dye component which transmits the red rays, thereon a green sensitive emulsion layer containing a colorless azo coupling component, thereon a yellow filter layer and on top of it a blue sensitive emulsion layer containing another colorless azo coupling component. A further object of this invention is to convert the colored dye former incorporated in the red sensitive layer into a cyan dye, the dye former in the green sensitive layer into a magenta dye, the dye former in the blue sensitive layer into a yellow dye and to process the material in such a way as to get an image in natural colors. Still further objects are seen from the following:

The dye former to be incorporated in the red sensitive emulsion is an azo dye, obtained by coupling an aminonaphtholsulfonic acid or an N-hydrocarbon derivative thereof with a diazo compound in acid solution, said azo dye being capable of coupling a second time with a diazo compound and to yield thereby a polyazo dye of a deeper shade.

Many aminonaphtholsulfonic acids can serve as starting materials for these dyes, e. g.:

6-amino-1-naphthol-3-sulfonic acid (J-acid)
8-amino-1-naphthol-4-sulfonic acid
8-amino-1-naphthol-5-sulfonic acid (S-acid)
8-amino-1-naphthol-3,5-disulfonic acid (K-acid)
8-amino-1-naphthol-3,6-disulfonic acid (H-acid)
8-amino-1-naphthol-4,6-disulfonic acid (B-acid)
N-benzyl-H-acid
N-ethyl-H-acid The aminonaphtholsulfonic acids are combined in known manner with diazo compounds. These diazo compounds may contain any substituents such as halogen, alkyl, aryl, alkoxy, aryloxy, carbonyl, carboxyl, sulfone, sulfonamide, sulfonic acid, acylamino, ester, azo groups, etc. Some of these groups may undergo chemical reactions after the coupling has taken place, e. g., a nitrodiazo compound is coupled with an aminonaphtholsulfonic acid, the nitro group is converted into an amino group, and two of the resulting dye molecules are combined by the action of phosgene. A further variation consists of replacing the diazo compounds with tetrazo compounds which are coupled in acid solution with two equivalents of an aminonaphtholsulfonic acid or with one equivalent of an aminonaphtholsulfonic acid and one other azo coupling component such as salicylic acid.

Suitable simple diazo components are e. g., those derived by diazotisation from:

2,5-dichloroaniline,
2-amino-diphenylsulfone,
1-naphthylamine-3,6,8-trisulfonic acid,
4-chloro-2-aminoanisole,
4-chloro-2-aminodiphenyl ether,
benzidinesulfonedisulfonic acid,
4-nitraniline,
2-naphthylamine-5,7-disulfonic acid,
2,5-dichloroaniline-4-sulfonic acid.

Others of a more complex structure are obtained by diazotisation of e. g., the following amines:

The compound obtained by melting 3-nitrophthalic anhydride with anhydroaminobenzylalcohol and thereafter reducing the intermediate.

The compound obtained by condensing 2-acetylaminonaphthalene-4,8-disulfochloride with dehydrothiotoluidinesulfonic acid and by removing the acetyl residue by saponification.

The compound obtained by condensing N-(2,5-diaminobenzenesulfo)-carbazole with an ethylene maleic anhydride interpolymer. By coupling these diazo compounds with the above mentioned aminonaphtholsulfonic acids, dyes of from orange to magenta shades are obtained which, by coupling with the diazo compounds described below will be converted into violet, blue and blue-green dyes.

The component to be incorporated in the green sensitive layer can be any one of the many known magenta azo components, such as an aminonaphtholsulfonic acid, a naphtholsulfonic acid, a naphthylamine sulfonic acid, alkyl-, aryl- and acyl derivatives thereof, mono-alkylchromotropic acid, a heterocyclic compound such as an hydroxynaphthiminazolsulfonic acid, etc.

The component to be incorporated in the top layer can be selected from the many known yellow azo dye components such as acetoacetanilides, malonic esters, pyrazolones, indoles, 2,4-dioxotetrahydroquinolines, phenols, etc. Suitable components for the blue sensitive layer are: the compound obtained by melting anhydroaminobenzylalcohol with salol, N,N'-decamethylenebis-(2,4-dioxo-1,2,3,4-tetrahydroquinoline), N-stearoyl-m-aminophenol, and many others.

Some of the above mentioned colorless and colored dye components are fast to diffusion. Others which will diffuse can be converted into non-diffusing salts by precipitation within the photographic emulsions with organic bases such as described in Gaspar U. S. Patent 2,046,067 or in Dreyfuss U. S. Patents 2,317,184 and 2,368,647.

The azo coupling components, incorporated into the layers of a multilayer material are converted into azo dyes by coupling with a diazo compound at any point after the exposure to light. Many simple diazo compounds are suitable in this process, e. g., those obtained by diazotisation of aniline, sulfanilic acid, benzidine-2,2'-disulfonic acid, 2,5-dichloroaniline, aminohydroquinone dimethyl ether, etc. The diazo compounds can be replaced by diazo-forming compounds such as amines, antidiazotates, triazenes, nitroso compounds and others which are converted into the diazonium salts during the processing of the material. The diazo-forming substances are incorporated in the emulsions before coating or they are absorbed into the layers from processing baths. If they are incorporated in the emulsion, they may be in admixture with the azo coupling components or they may be bound to these by chemical bonds. The diazo compounds are destroyed at the desired points so that dye images are formed by coupling directly, or they are coupled uniformly, and the azo dyes formed are destroyed locally.

*Example 1*

20 ml. of a 3% solution of the dye (2,5-dichlorobenzene)-(1 azo 7)-(8-amino-1-naphthol-3,6-disulfonic acid) and 16 ml. of a 3% solution of anhydrobiguanidobenzylalcohol acetate are added to 150 ml. of a silver bromide gelatin emulsion with due precaution that the precipitated dye does not separate out. The dyed emulsion is sensitized to red light and coated on a transparent cellulose acetate base. On top of this emulsion is coated a green sensitive emulsion which contains 0.7 gr. of N-(naphthalene-2-sulfo)-8-amino-1-naphthol-3,6-disulfonic acid, and an equal amount of anhydrobiguanidobenzylalcohol acetate per 150 ml. emulsion. Thereon is coated a fogged emulsion containing 0.5 gram of Paper Yellow 3G (Schultz, Farbstofftabellen, 7th ed., #724) and 0.6 gram of the same precipitating agent as above, and finally an unsensitized emulsion containing for 150 ml. emulsion 0.7 gram of 1,1' - [3,3' - disulfo - diphenylene-(4,4')]-bis-[pyrazolone-(5)-carbonic acid-(3)] and an equal amount of the above mentioned polybiguanide acetate.

*Example 2*

The photographic material of the Example 1 is exposed, developed and fixed in known manner. Thereupon the superimposed silver images are converted into silver salt images, e. g., in a copper chloride bath into silver chloride images. After a thorough wash, the material is transferred into a bath containing per liter solution:

0.3 gram of 4-chloro-1-methoxybenzenediazonium beta-naphthalenesulfonate
3.5 ml. glac. acetic acid
2.1 gr. sodium acetate (anhydrous).

After about 10 minutes the coupling of the three dyes is completed; thereupon the silver salt is redeveloped into metallic silver, and the dyes are destroyed locally, e. g., according to Gaspar U. S. Patent Re. 22,308. After removing the residual silver in known manner, an image in natural colors is obtained.

*Example 3*

Similar results are obtained if the azo dye, used as dye component in the red sensitive layer of Example 1 is replaced by another azo dye, e. g., the magenta dye prepared by coupling benzidinesulfonedisulfonic acid with K-acid in acid solution. When incorporated into a gelatin layer and treated in an aqueous 4-chloro-1-ethoxybenzene-2-diazonium sulfate solution, it is converted into a blue-green dye. The dye prepared by coupling 2,5-dichloroaniline in acid solution with B-acid, when coupled again with tetrazotized benzidine-2,2-disulfonic acid, produces another blue-green dye. All the second couplings are easily performed in photographic baths, and the blue-green dyes obtained bleach easily in the above mentioned dye destruction solutions.

Whereas in the above examples all three of the azo components couple simultaneously in the indicated diazo bath, the pH of the diazo bath can be adjusted so that only part of the components are converted into dyes. This is particularly the case if part of the components have phenolic (or enolic) groups and others have amino groups ortho or para to the coupling position. For example, if the magenta component of the Example 1 is replaced by 2-lauryl-aminonaphthalene-7-sulfonic acid and the material is treated in a bath containing diazotized p-toluidine at pH=3.2 only the magenta component couples. The excess of the diazonium salt is washed out from the material, preferably with acidic wash water containing bisulfite or with other suitable diazo inactivating means, and thereupon the other two components can be coupled with a different diazo compound, e. g., with diazotized o-aminodiphenyl ether at pH 6.8. In an analogous manner, the yellow azo component can be replaced by a derivative of diphenylamine and coupled selectively with diazotised sulfanilic acid, at a low pH whereby the phenolic magenta and cyan azo components do not couple. These can be coupled subsequently with another diazo component such as diazotized aminohydroquinone dimethyl ether. Not being limited to one diazo component for all three of the azo coupling components, the number of suitable components becomes larger, and the selection of components producing the desired shades becomes much easier.

This same goal can be reached by incorporating in all or part of the layers, in addition to the azo coupling components, non-diffusing diazo forming components, or by incorporating in all or part of the layers components which have azo coupling and diazo forming functions. Such a component suitable for the red sensitive layer is e. g., the compound (4-amino-diphenyl-2,2'-disulfonic acid)-(4'-azo-7)-(8-amino-1-naphthol-3,6-disulfonic acid).

The material described in Example 1 can be replaced by a material which contains in the bottom layer H-acid as azo coupling component. If this material, after the exposure to light, development, fixing and rehalogenation of the silver image, is treated in a hydrochloric acid bath containing 2,5-dichlorobenzenediazonium salt, the dye (2,5-dichlorobenzene)-(1 azo 7)-(8-amino-1-naphthol-3,6-disulfonic acid) forms in the bottom layer whereas the coupling components in the other layers do not couple. The excess of the diazonium salt is removed and the material is treated in the coupling bath described in Example 2. The result is the same as that described above.

Diazo baths used for coupling azo components incorporated in gelatin layers, are allowed to be further off from neutral than they are if the coupling takes place in solution, i. e., coupling components known to couple in solution at pH=7, may be coupled at a pH<7 if they are incorporated in gelatin layers. The pH values given refer to the processing baths and not to the true pH values within the layers.

The couplings can be accelerated to a remarkable degree by the addition of wetting agents to the diazo bath or by suitable additions to the photographic emulsions; e. g., if the layers of the material described in Example 1 contain more of the polybiguanide acetate than is directed, the coupling takes place with still greater speed than is indicated in Example 2.

The azo dyes obtained by coupling in acid solution diazo compounds with aminonaphthol sulfonic or disulfonic acids, can be used as azo coupling components in transparent or opaque photographic materials. They can be used in unsensitized silver halide emulsions or in emulsions which are sensitized to any color. They may be incorporated in any or all desired layers of a single- or multi-layer coating. Layers containing said coupling components may be combined with layers which are colored or colorless.

As many variations of this invention may be made without departing from the spirit and scope thereof, it is to be understood that we do not limit ourselves to the specific examples thereof except as defined in the appended claims.

We claim:

1. A photographic material comprising a silver halide emulsion layer containing as an azo coupling component an azo dye having the formula

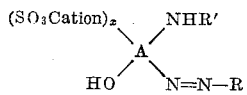

wherein A is a residue of naphthalene, R' is selected from the group consisting of hydrogen and hydrocarbon radicals, R is a residue of a diazo compound, $x$ is an integer selected from the group consisting of 1 and 2, and where the group R—N=N— is in ortho position to the group —NHR' and where a diazo compound can couple in a position ortho to the hydroxyl group.

2. A photographic material comprising on a support a red sensitive silver halide emulsion layer containing as an azo coupling component a dye obtained by coupling in acid solution a diazo compound with a compound selected from the group consisting of aminonaphtholsulfonic and aminonaphtholdisulfonic acids, thereon a green sensitive emulsion layer containing a colorless azo coupling component, thereon a yellow filter layer, and thereon a blue sensitive emulsion layer containing a colorless azo coupling component, said azo coupling component in the red sensitive layer being capable of being converted into a blue dye by the action of a diazo compound, said azo coupling component in the green sensitive layer being capable of being converted into a magenta dye by the action of a diazo compound, and said azo coupling component in the blue sensitive layer being capable of being converted into a yellow dye by the action of a diazo compound.

3. A photographic material comprising a silver halide emulsion layer containing as an azo coupling component an azo dye having the formula

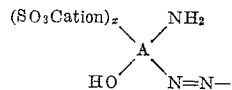

wherein A is a residue of naphthalene, R is a residue of a diazo compound, $x$ is an integer selected from the group consisting of 1 and 2 wherein OH stands in 1 position, —NH$_2$ stands in 8-position and —N=N—R stands in 7-position of the naphthalene residue A and where a diazo compound can couple in a position ortho to the hydroxyl group.

4. A photographic material comprising a silver halide emulsion layer containing as an azo coupling component an azo dye having the formula

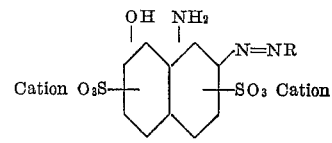

wherein R is the residue of a diazo compound.

5. In a process of producing a dye image in a photographic silver halide emulsion layer containing as an azo coupling component an azo dye having the formula

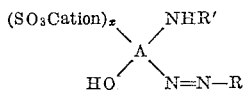

wherein A is a residue of naphthalene, R' is selected from the group consisting of hydrogen and hydrocarbon radicals, R is a residue of a diazo compound, $x$ is an integer selected from the group consisting of 1 and 2, and where the group R—N=N— is in ortho position to the group —NHR' and where a diazo compound can couple in a position ortho to the hydroxyl group, the step which comprises coupling said dye with a diazo compound at a point in the process after exposure of said photographic material to light.

6. In a process of producing a multicolor dye image from a photographic material comprising on a support a red sensitive silver halide emulsion layer containing as an azo coupling component a dye obtained by coupling in acid solution a diazo compound with a compound selected from the group consisting of aminonaphtholsulfonic and aminonaphtholdisulfonic acids, thereon a green sensitive emulsion layer containing a colorless azo coupling component, thereon a yellow filter layer, and thereon a blue sensitive emulsion layer containing a colorless azo coupling component, said azo coupling component in the red sensitive layer being capable of being converted into a blue dye by the action of a diazo compound, said azo coupling component in the green sensitive layer being capable of being converted into a magenta dye by the action of a diazo compound, and said azo coupling component in the blue sensitive layer being capable of being converted into a yellow dye by the action of a diazo compound, the steps which comprise coupling said azo coupling component in the red sensitive layer with a diazo compound to form a blue dye, coupling said azo coupling component in the green sensitive layer with a diazo compound to form a magenta dye and coupling said azo coupling component in the blue sensitive layer with a diazo compound to form a yellow dye.

7. In a process of producing a multicolor dye image from a photographic material comprising on a support a red sensitive silver halide emulsion layer containing as an azo coupling component a dye obtained by coupling in acid solution a diazo compound with a compound selected from the group consisting of aminonaphtholsulfonic and aminonaphtholdisulfonic acids, thereon a green sensitive emulsion layer containing a colorless azo coupling component, thereon a yellow filter layer, and thereon a blue sensitive emulsion layer containing a colorless azo coupling component, said azo coupling component in the red sensitive layer being capable of being converted into a blue dye by the action of a diazo compound, said azo coupling component in the green sensitive layer being capable of being converted into a magenta dye by the action of a diazo compound, and said azo coupling component in the blue sensitive layer being capable of being converted into a yellow dye by the action of a diazo compound, the step which comprises coupling all of said azo coupling components with a diazo compound to form a blue dye in said red sensitive layer, a magenta dye in said green sensitive layer, and a yellow dye in said blue sensitive layer.

8. In a process of producing a multicolor dye image in a photographic material comprising three silver halide emulsion layers of which one contains an aminonaphthol selected from the group consisting of aminonaphtholsulfonic and aminonaphtholdisulfonic acids, which are capable of acting both as amine azo coupling components and as phenolic azo coupling components and the other two layers each contain a different hydroxyl azo coupling component the steps which comprise coupling said aminonaphthol with a diazo compound in acid solution to form a monoazo dye at a point in the process after exposure of said photographic material to light and subsequently coupling said monoazo dye and the other hydroxyl azo coupling components with a common diazo compound.

References Cited in the file of this patent

UNITED STATES PATENTS

| Number | Name | Date |
| --- | --- | --- |
| 2,071,688 | Gaspar | Feb. 23, 1937 |
| 2,166,049 | Gaspar | July 11, 1939 |
| 2,271,176 | Gaspar | Jan. 27, 1942 |
| 2,297,732 | Woodward | Oct. 6, 1942 |
| 2,304,884 | Carroll | Dec. 15, 1942 |
| 2,342,620 | Woodward | Feb. 22, 1944 |
| 2,346,531 | Allen | Apr. 11, 1944 |
| 2,368,463 | Gaspar | Jan. 30, 1945 |
| 2,394,527 | Woodward | Feb. 5, 1946 |
| 2,418,624 | Chechak et al. | Apr. 8, 1947 |
| 2,431,996 | Duerr et al. | Dec. 2, 1947 |
| 2,449,966 | Hanson | Sept. 21, 1948 |
| 2,470,769 | Gaspar | May 24, 1949 |

OTHER REFERENCES

Friedman, "History of Color Photography," pp. 427–428, published 1944, The American Photographic Publishing Company, Boston.

Saunders, "The Aromatic Diazo Compounds," 2nd ed., published 1949, Edward Arnold Co., London.